(12) United States Patent
Bennice et al.

(10) Patent No.: US 12,168,296 B1
(45) Date of Patent: Dec. 17, 2024

(54) RE-SIMULATION OF RECORDED EPISODES

(71) Applicant: GOOGLE LLC, Mountain View, CA (US)

(72) Inventors: Matthew Bennice, San Jose, CA (US); Paul Bechard, San Jose, CA (US); Joséphine Simon, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 338 days.

(21) Appl. No.: 17/463,870

(22) Filed: Sep. 1, 2021

(51) Int. Cl.
*B25J 9/16* (2006.01)
(52) U.S. Cl.
CPC .............. *B25J 9/1605* (2013.01); *B25J 9/163* (2013.01); *B25J 9/1671* (2013.01)
(58) Field of Classification Search
CPC ......... B25J 9/1605; B25J 9/163; B25J 9/1671
See application file for complete search history.

(56) References Cited

U.S. PATENT DOCUMENTS

| | | |
|---|---|---|
| 9,811,074 B1 | 11/2017 | Aichele et al. |
| 10,399,778 B1 | 9/2019 | Shekhawat |
| 10,926,408 B1 | 2/2021 | Vogelsong et al. |
| 2014/0371912 A1* | 12/2014 | Passot .................. G06N 3/049 700/264 |
| 2020/0061811 A1 | 2/2020 | Iqbal et al. |
| 2020/0361082 A1 | 11/2020 | Bai et al. |
| 2021/0023711 A1 | 1/2021 | Lee et al. |
| 2021/0122045 A1 | 4/2021 | Handa |
| 2021/0170579 A1* | 6/2021 | Toriihara ............... B25J 9/1697 |

FOREIGN PATENT DOCUMENTS

| | | |
|---|---|---|
| DE | 102019001969 | 10/2019 |
| JP | 2019217557 | 12/2019 |

OTHER PUBLICATIONS

Kuffner, J.J.Jr.; Autonomous Agents for Rela-Time Animation; Dissertation submitted to the Department of Computer Science of Stanford University; 180 pages; dated Dec. 1999.

(Continued)

*Primary Examiner* — Adam R Mott
*Assistant Examiner* — Alyzia N Dilworth
(74) *Attorney, Agent, or Firm* — Gray Ice Higdon (57) ABSTRACT

Implementations are provided for generating a plurality of simulated training instances based on a recorded user-directed robot control episode, and training one or more robot control policies based on such training instances. In various implementations, a three-dimensional environment may be simulated and may include a robot controlled by an external robot controller. A user may operate the robot controller to control the robot in the simulated 3D environment to perform one or more robotic tasks. The user-directed robot control episode, including responses of the external robot controller and the simulated robot to user commands and/or the virtual environment, can be captured. Features of the captured user-directed robot control episode can be altered in order to generate a plurality of training instances. One or more robot control policies can then be trained based on the plurality of training instances.

16 Claims, 6 Drawing Sheets

(56) References Cited

OTHER PUBLICATIONS

Mathew, Sajee; AWS—Overview of Amazon Web Services; 95 pages; dated Apr. 2020.
Kapur, Pulkit; Introduction to Automatic Testing of Robotics Applications; AWS Robotics Blog; 6 pages; dated Jul. 1, 2020.
Brunner, B. et al.; Task Directed Programming of Sensor Based Robots; Elsevier; 8 pages; dated 1995.
Kuffner, J.J.Jr. et al.; Graphical Simulation and High-Level Control of Humanoid Robots; IEEE on Intelligent Robots and Systems; 6 pages; dated 2000.
Balakirsky, S. et al.; From Simulation to Real Robots with Predictable Results: Methods and Examples; 27 pages; dated 2009.
Tarnoff, N. et al.; Graphical Simulation for Sensor Based Robot Programming; Journal of Intelligent and Robotic Systems; 14 pages; dated 1992.
Foote, T.; tf: The Transform Library; IEEE; 6 pages; dated 2013.

* cited by examiner

RE-SIMULATION OF RECORDED EPISODES

BACKGROUND

Robots are often equipped with various types of machine learning models, or "robot control policies," that are trained (or "learned") to govern robot behavior during performance of various tasks and/or engagement with dynamic environments. These robot control policies are sometimes trained by causing real-world physical robots to repeatedly perform tasks, with outcomes of the repeated tasks being recorded as training instances and used to tune the models. However, extremely large numbers of training instances may be needed to sufficiently train a machine learning model to enable a robot to perform tasks in a satisfactory manner.

The time and costs associated with training machine learning models through real-world operation of physical robots may be reduced and/or avoided by simulating robot operation in simulated (or "virtual") environments. For example, a three-dimensional (3D) virtual environment may be simulated in which various robotic tasks may be performed, such as acting upon simulated interactive objects. The robot itself may also be simulated in the virtual environment, with one or more of the simulated tasks being recorded as training instances. Robot simulation provides an opportunity to generate and apply a large number of recorded training instances for relatively little cost.

SUMMARY

In some cases, a training instance or episode for training a robot control policy may be created when the simulated robot is controlled manually by a user to perform various tasks in the 3D virtual environment of the simulation. The machine learning model(s) can be trained based on outcomes of these training instances in a process often referred to as "imitation learning." However, one of the difficulties with imitation learning is the amount of time that must be spent having human users direct the simulated robots to perform the simulated task(s) in various simulated environments.

Accordingly, implementations are described herein for increasing the number of training instances that can be used to train the robots to perform tasks in various environments without requiring a human user to control the robot in each of those various environments. More particularly, but not exclusively, implementations are described herein for generating a plurality of training instances by altering one or more features of recorded user-directed robot control episodes, such as features of the "scene" and/or features of the robot itself and/or its operation.

In many scenarios in which techniques described herein are practiced, a real-life (e.g., hardware), external robot controller is coupled with a computing system that implements a virtual environment for robot simulation. The robot controller generates and issues sets of robot control commands based on user commands of a human user operating the robot controller as well as on observed states of the robot and/or states of the virtual environment. A given state of the virtual environment is ascertained via data generated by one or more virtual sensors based on their observations of the virtual environment. It may be the case that the robot controller is unable to distinguish between operating in the real world and operating in a simulated environment. However, such user-directed robot control episodes will each require a user to dedicate time to operating the simulated robot in the virtual environment during the simulated task(s).

Accordingly, a plurality of training instances that may be used to train the robot(s) can be generated based on a single such user-directed robot control episode. For example, a simulated task may be to "open the bedroom door." During a user-directed robot control episode for the simulated task, the user may provide user commands to the robot controller to control the robot in the virtual environment. For example, the user may provide user commands to the robot controller using a joystick, one or more buttons on the robot controller or another device communicatively coupled to the robot controller, such as a head-mounted display (HMD), haptic gloves (e.g., used in conjunction with an HMD), etc. The robot controller issues robot control commands to the simulated robot based on the user commands received from the user. The robot control commands may include, for example, joint commands and actuator or end effector commands for controlling one or more functions of the simulated robot in the virtual environment. The user commands issued by the user, state data describing state(s) of the 3D virtual environment, and state data describing state(s) of the simulated robot may be gathered during the user-directed robot control episode. In order to generate a plurality of training instances based on these user-directed robot control episodes, one or more states of the virtual environment or of the simulated robot, or one or more of the user commands or the joint commands corresponding to the user commands may be altered. One or more robot control policies may then be trained based on the generated plurality of training instances.

Such alterations to the user-directed robot control episode made in generating such training instances may include, for example, changes to visual features of the virtual environment (e.g., cosmetic changes) as well as to physical features of the virtual environment (e.g., omission, deletion, resizing, and/or repositioning of physical objects, including interactive objects). Such alterations may further include changes to capabilities or hardware of the simulated robot (e.g., movement speed, adding/removing a robotic arm, different end effectors, etc.) or to one or more other states of the simulated robot (e.g., changes to priority assignment of commands in a command queue, different starting positions or poses of the simulated robot, etc.). Such alterations may also include delaying, speeding up, omitting, or altering user commands of the episode, or of the joint commands relayed to the simulated robot that are generated based on the state of the simulated environment and/or the user commands. For example, a user or joint command may be altered in a manner corresponding to if the user had applied more force to a control joystick.

In some implementations, the robot control policies may be trained based on a reward system for the training instances. In such a reward system, the virtual environment and the state data of the simulated robot recorded during the training instance may be compared to defined conditions of success or failure for the simulated task, and/or to defined conditions of the user-directed robot control episode. A reward may then be assigned to a particular training instance, and the robot control policies may be trained further based on the rewards associated with corresponding training instances.

In some implementations, a computer implemented method may be provided that includes: simulating a 3D environment, wherein the simulated 3D environment includes a simulated robot controlled by an external robot controller; capturing a user-directed robot control episode in which the robot performs one or more tasks, the user-directed robot control episode including: first state data describing one or more states of the simulated 3D environment, user command data describing one or more user commands issued by a user to the external robot controller for controlling the simulated robot in the simulated 3D environment, and second state data describing one or more states of the simulated robot; generating a plurality of training instances based on the captured user-directed robot control episode, wherein each training instance of the plurality is generated based on altering one or more features of the captured user-directed robot control episode data; and training one or more robot control policies based on the plurality of training instances.

In various implementations, the first data describing one or more states of the simulated 3D environment may include simulated data generated by one or more simulated sensors of the simulated robot, such as simulated vision sensors. In various implementations, the user command data may include the joint commands issued by the external robot controller to the simulated robot corresponding to and generated based on the user commands issued by the user to the external robot controller. In various implementations, the second state data describing one or more states of the simulated robot may include various capabilities, simulated hardware, positions, poses, and other details of current and past states of the simulated robot during a given robot control episode or training instance. In some implementations, the first data, the user command data, and/or the second data may include state data or command data corresponding to one or more previous or future states of the virtual environment or the robot. For example, in some implementations, the user command data may include one or more past and/or future user commands issued to the external robot controller such that the external robot controller may use future expected states of the robot to make determinations about current joint commands to issue to the simulated robot.

Other implementations may include a non-transitory computer-readable storage medium storing instructions executable by a processor to perform a method such as one or more of the methods described herein. Yet another implementation may include a control system including memory and one or more processors operable to execute instructions, stored in the memory, to implement one or more modules or engines that, alone or collectively, perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
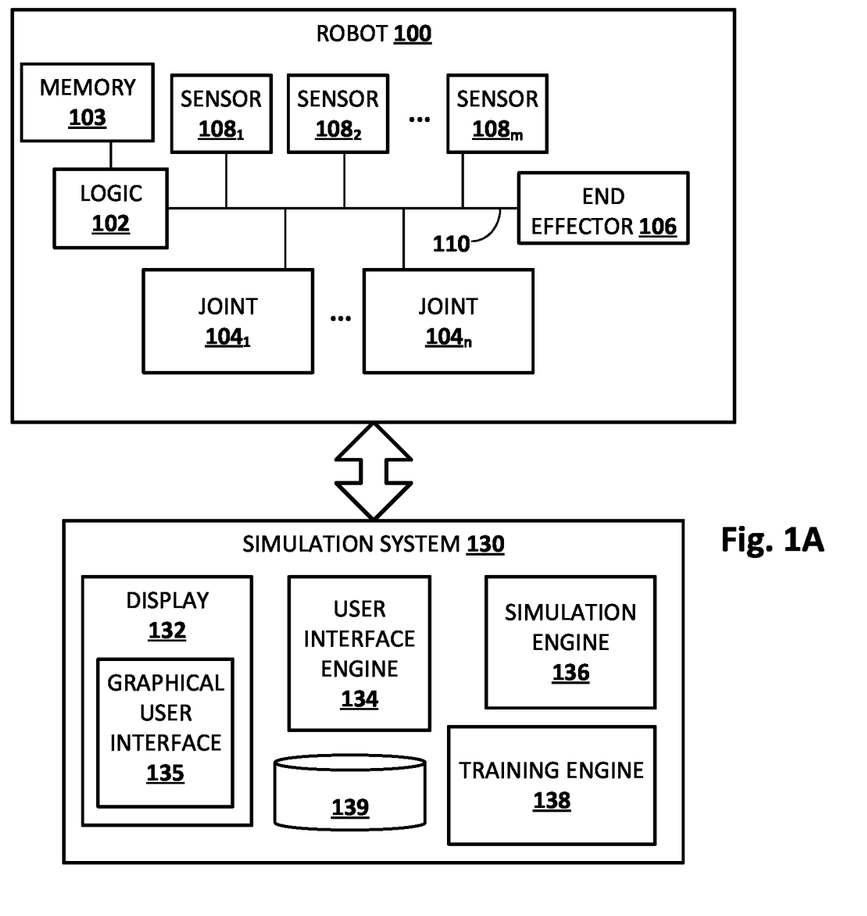
FIG. 1A is a schematic diagram of an example environment in which selected aspects of the present disclosure may be practiced in accordance with various implementations.

FIG. 1A is a schematic diagram of an example environment in which selected aspects of the present disclosure may be practiced in accordance with various implementations. The various components depicted in FIG. 1A, particularly those components forming a simulation system 130, may be implemented using any combination of hardware and software. In some implementations, simulation system 130 one or more servers forming part of what is often referred to as a "cloud" infrastructure, or simply "the cloud."

Figure 1B:
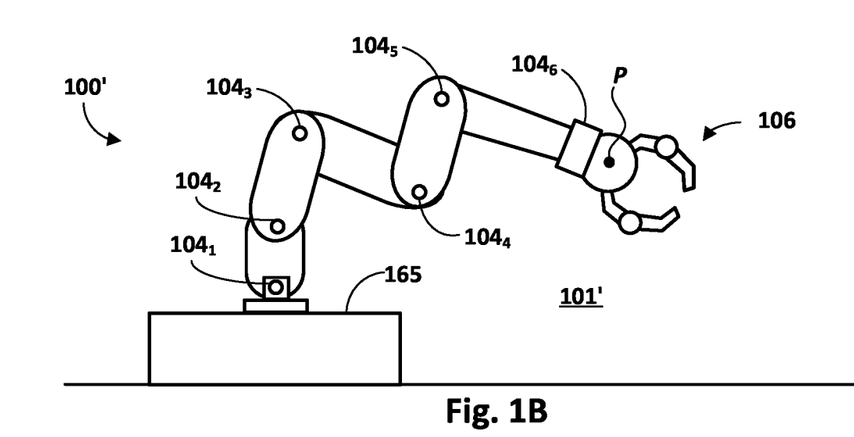
FIG. 1B depicts a non-limiting example of a simulated robot in the form of a robotic arm.

A robot 100 may be in communication with simulation system 130. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. One non-limiting example of a robot arm is depicted in FIG. 1B. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more joints 1041-n, one or more end effectors 106, and/or one or more sensors 1081-m. e.g., via one or more buses 110. As used herein, "joint" 104 of a robot may broadly refer to actuators, motors (e.g., servo motors), shafts, gear trains, pumps (e.g., air or liquid), pistons, drives, propellers, flaps, rotors, or other components that may create and/or undergo propulsion, rotation, and/or motion. Some joints 104 may be independently controllable, although this is not required. In some instances, the more joints robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances.

Sensors 108 may take various forms, including but not limited to 3D laser scanners or other 3D vision sensors (e.g., stereographic cameras used to perform stereo visual odometry) configured to provide depth measurements, two-dimensional cameras (e.g., RGB, infrared), light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors 108$_1$-$m$ are depicted as being integral with robot 100, this is not meant to be limiting.

Simulation system 130 may include one or more computing systems connected by one or more networks (not depicted). An example of such a computing system is depicted schematically in FIG. 6. In various implementations, simulation system 130 may be operated to simulate a three-dimensional ("3D") virtual environment in which a simulated robot 100' (FIG. 1B) is operated. In various implementations, one or more robot avatars may be controlled by a single robot controller. As noted previously, a robot controller may include, for instance, logic 102 and memory 103.

Various modules or engines may be implemented as part of simulation system 130 as software, hardware, or any combination of the two. For example, in FIG. 1A, simulation system 130 includes a display interface 132 that is controlled, e.g., by a user interface engine 134, to render a graphical user interface ("GUI") 135. A user may interact with GUI 135 to trigger and/or control aspects of simulation system 130, e.g., to control a simulation engine 136 that simulates the aforementioned virtual environment.

Simulation engine 136 may be configured to perform selected aspects of the present disclosure to simulate a 3D virtual environment in which simulated robots 100' can be operated to perform various tasks, e.g., for purposes of recording training instances that are then usable to learn a robot policy (e.g., train a machine learning model). For example, simulation engine 136 may be configured to simulate a 3D environment that may or may not include one or more interactive objects. The virtual environment may include one or more simulated robots 100' that are controlled by a robot controller (e.g., logic 102 and memory 103 of robot 100 in combination) that is external from the virtual environment. Note that the virtual environment need not be rendered visually on a display. In many cases, the virtual environment and the operations of simulated robots 100' within it may be simulated without any visual representation being provided on a display as output.

Simulation engine 136 may be further configured to provide, to the robot controller that controls one or more simulated robots 100' in the virtual environment, sensor data that is generated from a perspective of at least one of the simulated robots 100' that is controlled by the robot controller and that indicates at least one state of the simulated virtual environment. As an example, suppose a particular simulated robot's 100' vision sensor is pointed in a direction of a particular virtual object in the virtual environment. Simulation engine 136 may generate and/or provide, to the robot controller that controls that simulated robot 100', simulated vision sensor data that depicts the particular virtual object as it would appear from the perspective of the particular simulated robot 100' (and more particularly, its vision sensor) in the virtual environment. Simulation engine 136 may store such simulated environment state data in remote or local database(s), such as database 139.

Simulation engine 136 may also be configured to receive, from the robot controller that controls one or more simulated robots 100' in the virtual environment, one or more sets of joint commands that cause actuation of one or more joints of one or more of the simulated robots that is controlled by the robot controller. For example, the external robot controller may process the sensor data received from simulation engine 136 to make various determinations, such as recognizing an object and/or its pose (perception), and/or planning a path to the object and/or a grasp to be used to interact with the object. The external robot controller may make these determinations and may generate (execution) joint commands for one or more joints of a simulated robot 100' associated with the robot controller. In the context of the virtual environment simulated by simulation engine 136, these set(s) of joint commands may be used, e.g., by simulation engine 136, to actuate joint(s) of one or more of the simulated robots 100' that are controlled by the external robot controller. Simulation engine 136 may store such joint commands in remote or local database(s), such as database 139.

In some implementations, simulation engine 136 may additionally receive, from the external robot controller, robot state data describing one or more current states of the simulated robot 100' and store the robot state data in remote or local database(s), such as database 139. For example, the external robot controller can monitor the sensor data and/or state data describing the simulated environment of the simulated robot 100' in order to determine one or more current states of the simulated robot 100'. Examples of such robot state data may include: physical descriptions of the simulated robot 100' and/or the parts of the simulated robot 100'; current poses, positions, or configurations of the simulated robot 100' (e.g., in the simulated environment as a whole or compared to one or more particular positions or objects in the simulated environment); measurements of executed joint commands (e.g., as compared to expected movements of the simulated robot 100' based on the joint commands issued); robot sensor health or noise measurements; successes or failures of issued joint commands; successes or failures of issued user commands (e.g., success/failure of translating into any joint command or the appropriate joint command, or of the simulated robot 100' to execute a joint command determined based on the issued user command, etc.); user or joint command queues and the priority of the commands in such queues; and any other data available to the external robot controller relevant to past, present, or future states of the simulated robot 100'. In some implementations, simulation engine 136 may determine the robot state data based on the state data of the simulated environment (e.g., simulated sensor data) and the joint commands and/or user commands provided to simulation engine 136 by the external robot controller. In some implementations, simulation engine 136 and the external robot controller can share data and work together to track various data related to one or more states of the simulated robot 100', and simulation engine 136 can determine the robot state data based on such data.

In some implementations, simulation engine 136 may be configured to monitor user commands issued by a user to the external robot controller, and/or to receive an indication of the user commands issued by the user from the external robot controller. The user commands may correspond to user inputs provided by the user to the external robot controller to cause the external robot controller to generate the joint commands based on the user commands as well as the sensor data received from simulation engine 136. The user may issue commands to the robot controller in a variety of ways. The user commands may correspond to various forms of user input to the external robot controller such as: spoken utterances of the user, touch input commands provided to a screen, joystick or other controls, user gestures, gaze of the user, and inputs from other electronic devices configured to communicate with the external robot controller. Simulation engine 136 may store such user command data in remote or local database(s), such as database 139.

In order to generate realistic training instances that can be used to train a robot control policy, such as a reinforcement learning machine learning model, simulation engine 136 may be configured to alter one or more features of the recorded user-directed robot control episode to generate a plurality of new, simulated training instances. Generating a new, simulated training instance from a recorded user-directed robot control episode could include altering at least one feature of: the simulated environment state data (e.g., a lighting condition, an object position or pose, color or texture of a surface, audio noise in the environment, obstacles located in the environment, etc.); the user command data (e.g., word choice of natural language command, omitting or changing timing of the delivery of commands issued from the user to the external robot controller, ambiguation or disambiguation of user commands (e.g., affecting the extent to which the external robot controller needs to be aware of current/past/future context to understand user commands), etc.); and the joint command data (e.g., distance or length, speed, degrees of rotation, force with which to move joints or to apply to objects, timing of the external robot controller issuing joint commands to the simulated robot 100' based on the received user commands, etc.). Simulation engine 136 may store such simulated training instances in remote or local database(s), such as database 139.

For example, during a given captured user-directed robot control episode, a user can issue user commands to the external robot controller to cause the simulated robot 100' to navigate around a table in a kitchen, move down a hallway, locate a bedroom two doors down the hallway on the left, and operate the doorknob of the bedroom door in order to open it. Simulation engine 136 can then create a plurality of training instances based on that captured user-directed robot control episode. These training instances may include, for instance, a first training instance in which the simulated robot 100' runs into the kitchen table (e.g., due to joint commands altered such that the simulated robot 100' only moved 3 inches to the left instead of 3 feet). In a second training instance, the simulated robot 100' may break the doorknob (e.g., due to a doorknob being changed from the "turning knob" type to the "pull-down lever" type). In a third training instance, the simulated robot 100' may open the wrong door (e.g., due to a user command of "locate the bedroom door" more ambiguous than the specific directions given during the training instance). In a fourth training instance, the simulated robot 100' may successfully execute all of the user commands, in spite of changes being made to the user-directed episode, such as the joint commands being altered (e.g., changed, delayed, accelerated, etc.), aspect(s) of the environment being altered cosmetically and/or physically, etc.

One or more positive or negative rewards may be assigned to a training instance, or portion of a training instance, based on outcomes of the training instances. The training instances, and/or portions of the training instances, can then be assigned positive or negative rewards by training engine 138. For example, with reference to the second training instance discussed above, training engine 138 can assign a negative reward to one or more potions of the second training instance associated with the simulated robot 100' incorrectly manipulating the doorknob and/or with the corresponding commands being issued that caused such incorrect manipulation. In such an example case, training engine 138 may assign an overall positive reward to the entire training instance (and/or the portion of the training instance in which the bedroom door was opened) based on the fact that the simulated robot 100' successfully navigated around the kitchen table, navigated through the hallway, located the bedroom door, and did indeed operate the doorknob "successfully", in that the simulated robot 100' did manage to open the bedroom door. By contrast, the fourth training instance, which resulted in successful execution of all the user commands in spite of various changes to various data, may be assigned both an overall positive reward and positive rewards for each of the constituent operations.

Such positive/negative reward data may be stored in association with respective training instances, and/or respective portions of training instances, in remote or local database(s), such as database 139. Training engine 138 can train one or more robot control policies based on the simulated training instances and the associated positive/negative reward data. The one or more robot control policies, once trained, can then be used by external robot controller(s) in controlling one or more physical robots in the real-world.

Database 139 may additionally store a priori knowledge about sensors and/or observed empirical data about how sensors tend to operate in the real world, as well as how environmental stimuli may perturb sensor output. Many vision sensors, such as those implemented using a charge-coupled device (CCD), may tend to heat up during use, and likewise may tend to cool down when not in use. These changes in temperature may perturb sensor output of the vision sensor in various ways, such as by artificially increasing/decreasing color temperature, and/or by introducing vignetting (e.g., natural or otherwise), Gaussian noise, motion blur, and/or chromatic aberration, to name a few. Similarly, output of IMUs, torque sensors, and/or other robot sensors may be perturbed (e.g., skew, drift) over time by mechanical and/or thermal conditions. In some implementations, simulation engine 136 may use this knowledge in order to generate more realistic sensor readings of the simulated environment to provide to the external robot controller during user-directed robot control episodes. In some implementations, simulation engine 136 may use knowledge about such sensors to select which sensors or which type of sensors to include in the user-directed robot control episode or simulated training instances. For example, a higher resolution vision sensor may be selected for the user-directed robot control episode, in order to make controlling the simulated robot 100' easier for the human controlling it. Whereas, in such an example, a lower resolution vision sensor may be used in the simulated training instances generated by simulation engine 136, in order to lower the resource costs of simulating and/or training based on a high number of episodes. In yet another example, the user-directed robot control episodes may use lower resolution vision sensors in order to lower the resource costs (e.g., network bandwidth usage for remote-controlled robot simulation) of simulating such an episode in real-time and/or of gathering a plurality of user-directed robot control episodes. Whereas, in such an example, the simulated training instances generated by simulation engine 136 may include higher resolution vision sensors, in order to better correlate to the vision sensors that will be used in physical robots trained based on the robot control policy.

Simulation engine 136 may use such data in generating simulated training instances. In this way, one or more robot control policies can be trained on such simulated episodes to compensate for sensor noise, signal degradation, or conflicting signals during performance of a task. For example, a robot control policy may be trained to adjust in order to compensate, or to outright ignore, sensor signals received from an audio sensor that has been submerged under water.

Database 139 may additionally store historical and/or empirical data about how various joints (e.g., 1041-*n*) and/or end effectors (e.g., 106) may tend to operate in the real world, e.g., in response to environmental conditions (e.g., temperature, humidity, pressure, gravity), wear and tear, etc. Additionally or alternatively, database 139 may store data about operating tolerances of various joints and/or end effectors. In some implementations, these operating tolerances may be determined from a priori knowledge, e.g., provided by a manufacturer based on how the joints are designed, and/or based on empirical observation in the field. In some implementations, simulation engine 136 may determine these tolerances based on outcomes of the simulated training instances (e.g., based on task successes or failures and the factors causing such).

FIG. 1B depicts a non-limiting example of a simulated robot 100' in the form of a robot arm in a 3D virtual environment 101'. An end effector 106 in the form of a gripper claw is removably attached to a sixth joint 1046 of simulated robot 100'. In this example, six joints 1041-6 are indicated. However, this is not meant to be limiting, and robots may have any number of joints. Simulated robot 100' also includes a base 165, and is depicted in a particular selected configuration or "pose." While not depicted, base 165 may or may not include mechanism(s) such as wheels or tracks for moving simulated robot 100' between locations.

Figure 2A:
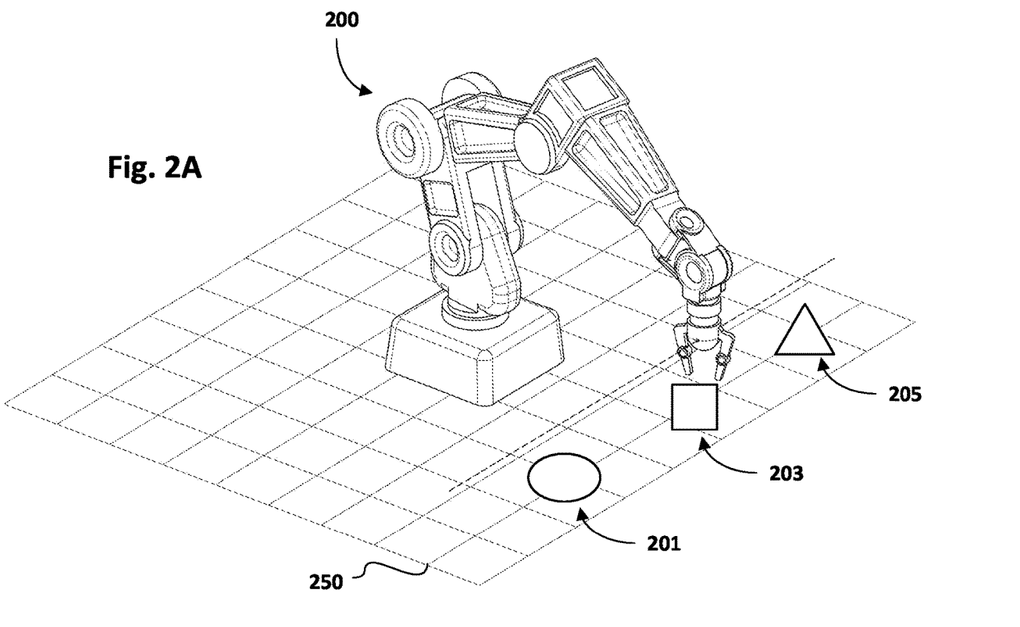
FIG. 2A and FIG. 2B depict an example simulated robot in an example simulated virtual environment performing one or more tasks as a part of a user-directed robot control episode.
Figure 2B:
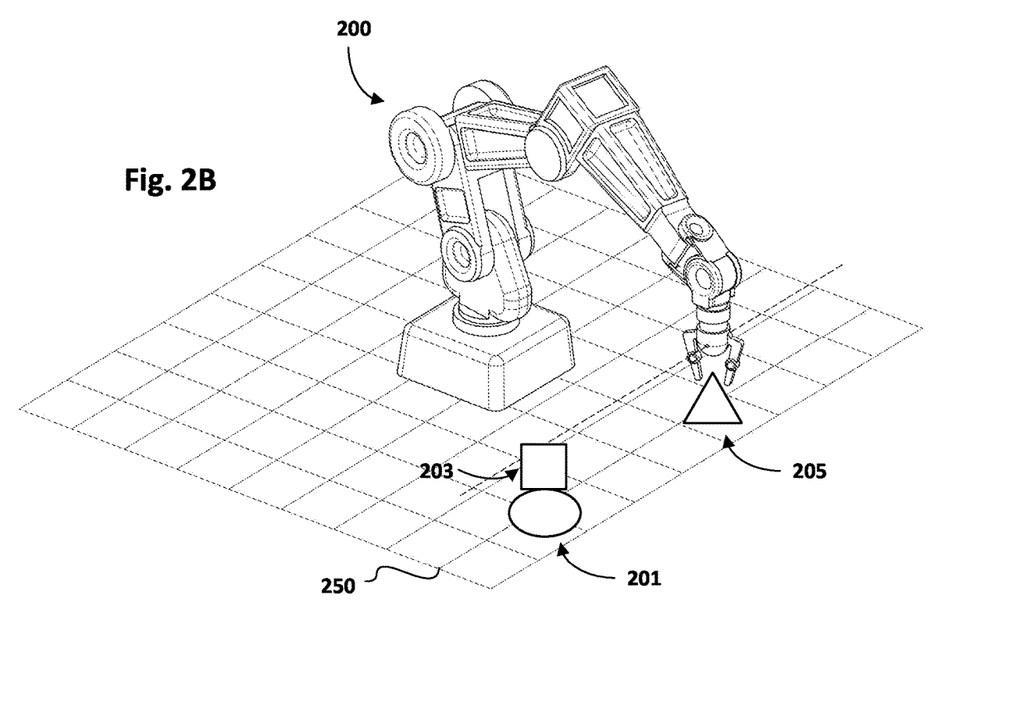

FIGS. 2A-2B depict an example simulated robot in an example simulated 3D virtual environment performing one or more tasks as a part of a user-directed robot control episode. The simulated robot 200 may operate under various constraints and/or have various capabilities. In this example, simulated robot 200 takes the form of a robot arm, similar to simulated robot 100' in FIG. 1B, but this is not meant to be limiting. Simulated robot 200 also includes an external robot controller, not depicted in FIGS. 2A-2B, which may correspond to, for instance, logic 102 and memory 103 of robot 100 in FIG. 1A. Simulated robot 200 may be operated at least in part based on vision data captured by a simulated vision sensor (not depicted), which may or may not be integral with simulated robot 200. In this example, simulated environment 250 may include a simulated conveyor belt and several simulated object parts 201, 203, 205. In such an example, a human user operating an external robot controller (not shown) may be tasked with operating simulated robot 200 to grasp simulated object parts as they pass by the robot arm of simulated robot 200 on the conveyor belt (see FIG. 2A) and assemble them into a desired configuration (see FIG. 2B).

In the real world (i.e., non-simulated environment), a robot controller may receive, e.g., from one or more sensors (e.g., 1081-M), sensor data that informs the robot controller about a state of the environment in which a robot operates. The robot controller may process the sensor data (perception) to make various determinations and/or decisions (planning) based on the current state of the environment and the current state of the robot (which can be monitored by the robot controller), such as path planning, grasp selection, localization, mapping, etc. Processed sensor data, and, in some implementations, current robot state data, may also be presented to a user controlling the robot via a user interface, such as a graphical user interface ("GUI") of a display screen, virtual reality ("VR") headset, touch screen, microphone (e.g., voice commands), etc. integrated with the robot controller or included in an electronic device communicatively coupled to the robot controller. The robot controller may process user commands received via the graphical user interface, or another user interface capable of controlling the robot controller, to make various determinations and/or decisions (planning) based on processing the sensor data, the robot state data, and the user commands. Many of these determinations and/or decisions may be made by the robot controller using one or more machine learning models, also referred to as "robot control policies." Based on these determinations/decisions, the robot controller may provide (execution) joint commands to various joint(s) (e.g., 1041-6 in FIG. 1B) to cause those joint(s) to be actuated.

When an external robot controller is coupled with virtual environment 250 simulated by simulation engine 136, one or more simulated robots 200 may be operated by the external robot controller in a similar fashion. Any number of simulated robots 200 may be controlled by any number of robot controllers. In many cases, the external robot controller may not be "aware" that it is "plugged into" virtual environment 250 at all, that it is actually controlling virtual joints of simulated robot(s) 200' in virtual environment 240 instead of real joints 1041-1. Instead of receiving real-world sensor data from real-world sensors (e.g., 108), simulation engine 136 may simulate sensor data within virtual environment 250, e.g., based on a perspective of simulated robot 200 within virtual environment 250. In FIGS. 2A-2B, for instance, simulated robot 200 includes or communicates with a simulated vision sensor (not depicted). The robot controller may not be able to distinguish the simulated sensor data from real-world sensor data.

It is not necessary that a fully-functional robot be coupled with simulation engine 136 in order to create/operate simulated robot(s). In some implementations, an external robot controller may be executed wholly or partially in software to simulate inputs to (e.g., sensor data) and outputs from (e.g., joint commands) of a robot. Such a simulated robot controller may take various forms, such as a computing device with one or more processors and/or other hardware. A simulated robot controller may be configured to provide inputs and receive outputs in a fashion that resembles, as closely as possible, an actual robot controller integral with a real-world robot. Thus, for example, the simulated robot controller may output joint commands at the same frequency as they are output by a real robot controller. Similarly, the simulated robot controller may retrieve sensor data at the same frequency as real sensors of a real-world robot. Additionally or alternatively, in some implementations, aspects of a robot that form a robot controller, such as logic 102, memory 103, and/or various busses to/from joints/sensors, may be physically extracted from a robot and, as a standalone robot controller, may be coupled with simulation system 130.

Standalone robot controllers and/or simulated robot controllers may be coupled to or "plugged into" virtual environment 250 via simulation engine 136 using various communication technologies. If a particular robot controller or simulated robot controller is co-present with simulation system 130, it may be coupled with simulation engine 136 using one or more personal area networks (e.g., Bluetooth), various types of universal serial bus ("USB") technology, or other types of wired technology (e.g., Ethernet). If a particular robot controller (simulated, standalone, or integral with a robot) is remote from simulation system 130, the robot controller may be coupled with simulation engine 136 over one or more local area and/or wide area networks, such as the Internet.

A user controlling simulated robot 200 during a user-directed robot control episode may interact with the external robot controller (physical or simulated) via one or more user interfaces associated with the external robot controller. For example, the user may receive processed sensor data in the form of a video rendering of simulated environment 250 on a display screen and may provide user commands to the external robot controller in the form of voice commands to a microphone, joystick commands, etc. Data describing these user commands, including what user commands were issued and when, can be monitored by simulation engine 136 and/or provided to simulation engine 136 by the external robot controller so that simulation system 130 can generate a plurality of simulated training instances based on the user-directed robot control episode.

Joint commands generated by the external robot controller based on the simulated sensor data (and the user commands, when applicable) may be provided to simulation engine 136, which operates joints of simulated robot 200 instead of real robot joints of a real robot. For example, the set of joint commands received from the external robot controller may be intercepted from a joint command channel between the external robot controller and one or more joints of simulated robot 200. Additional data describing the current state of simulated robot 200 and generated by or available to the external robot controller can also be monitored by simulation engine 136 and/or provided to simulation engine 136 by the external robot controller.

For example, current robot state data may describe simulated hardware or simulated hardware capabilities of simulated robot 200, the current position of one or more joints of simulated robot 200, the current position or pose of simulated robot 200 with respect to the simulated environment 250 or a map generated of simulated environment 250, the remaining degrees of freedom available for movement of a joint in one or more directions, the confidence levels of the external robot controller in determining one or more states of simulated robot, etc. Simulated robot 200 is therefore operated pursuant to the simulated sensor data (e.g., simulated environment 250 state data), the robot state data, the user commands (when applicable), and the joint commands.

In various implementations, simulation system 130 may be configured to generate a plurality of training instances and use them to train one or more robot policies. The plurality of training instances can include changes to various aspects of the captured user-directed robot control episode, such as changes to: [1] features of simulated environment 250 (i.e., as described by the simulated sensor data); [2] user command submissions to the external robot controller; [3] joint commands; and [4] robot state data. For example, a user may submit a user command (e.g., as a voice command, a typed command, a button-triggered command, etc.) of "close end effector" at a first particular time during a user-directed robot control episode. Various simulated training instances may be generated in which the user submits the same command at different times (e.g., before or after the first particular time), in which the user instead submits a slightly varied (e.g., voice) command of "close gripper" or "close it", and/or in which the user selects a graphical element on a touch screen that depicts an end effector closing instead of issuing the voice command "close end effector".

As another example, the user may submit a voice user command of "close end effector", but joint commands corresponding to the user voice command "close end effector" may be altered or have their timing altered before being submitted to simulated robot 200. The simulated environment 250 state data and/or the simulated robot state data may also be altered in generating the simulated training instances. For example, simulated robot 200 may have a more rudimentary two-prong gripping end effector present during the user-directed robot control episode replaced with a five-prong gripping effector that is more similar in appearance and capabilities to the human hand. As another example, an extraneous object may be included in simulated environment 250 that blocks the access of simulated robot 200 to an object it is meant to grasp or the texture of an object that simulated robot 200 is meant to grasp may be changed (e.g., made more slippery).

In various implementations, the changes introduced by simulated training episodes need not always change physical characteristics of the simulated environment or of the robot, or characteristics of the robot operation (e.g., delayed/omitted/added commands). In some implementations, some simulated training episodes may only be altered cosmetically. For example, assume a user-controlled training episode is generated where a robot picks up a white cup from a brown table in a room with blue walls and a gray floor. Numerous (e.g., hundreds, thousands, millions) simulated training episodes may be generated in which colors and/or textures of these various objects and surfaces are altered into different permutations. As one extreme example, all elements of the simulated environment may be rendered in military camouflage. So long as the robot commands and physical aspects of the simulated scene remain unaltered from the original user-controlled training episode, each of these simulated training episodes may result in a successful outcome, in spite of the cosmetic changes. Accordingly, the more training episodes that are simulated with more permutations of cosmetic changes, the better trained and prepared the robot control policy will be, which in turn increases the likelihood the robot will be able to successfully navigate new scenes of various colors/textures.

Figure 3:
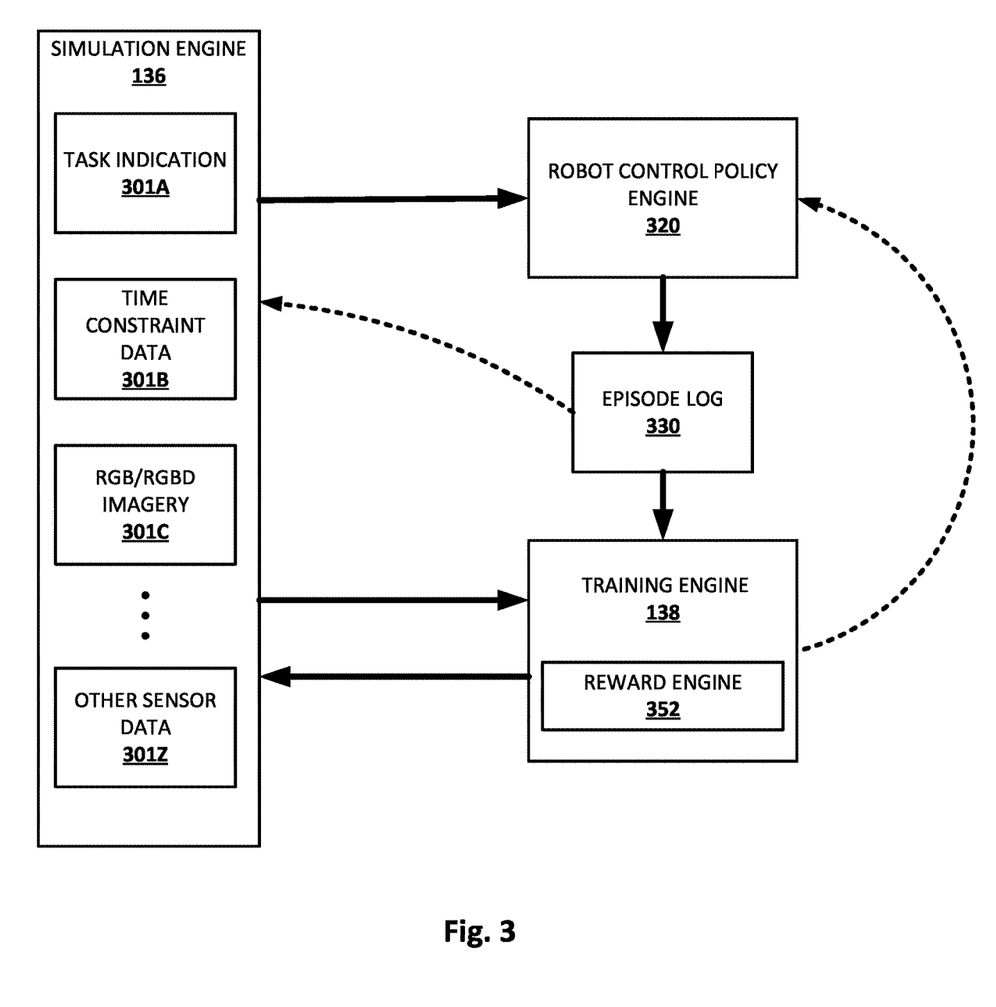
FIG. 3 illustrates an example environment in which implementations disclosed herein can be implemented.

FIG. 3 illustrates an example environment in which implementations disclosed herein can be implemented. The example environment includes simulation engine 136, robot control policy engine 320, and training engine 138, which includes reward engine 352. The example environment also includes various types and sources of data 301A-301Z used in simulating training instances and training the one or more robot control policies, such as task indication data 301A, time constraint data 301B, RGB/RGBD imagery data 301C, and various other types of sensor data 301Z. In some implementations, various other types of data 301Z may include, for example, user command data and joint command data.

In some implementations, the user command data and/or joint command data may be captured and stored in episode log 330. The example environment of FIG. 3 may be implemented in the example environment of FIG. 1 and/or FIGS. 2A-2B. For example, simulation engine 136 and training engine 138 may comprise simulation engine 136 and training engine 138 of FIG. 1. Episode log 330 includes captured training instance data that can be stored in database 139 and/or stored elsewhere but otherwise available to simulation engine 136 and/or training engine 138. The various types of data 301A-301Z and the one or more robot control policies to be trained may likewise be stored in database 139 and/or stored elsewhere but accessible to simulation engine 136 and/or training engine 138. For example, some data may be stored locally on an external robot controller, but may accessed by or transmitted to one or more modules of simulation system 130.

In the example environment of FIG. 3, robot control policy engine 320 will be presumed to be a sub-module of simulation engine 136 and/or of training engine 138 with access to the one or more robot policies to be used in performing a simulated task and then trained based on the performance, but this is not required. The one or more robot control policies may include machine learning model(s) that can be utilized to perform a robotic task (simulated or real-world). The machine learning models can take various forms, such as reinforcement learning policies, recurrent neural networks, etc. Robot control policy engine 320 can train the one or more robot control policies based on user-directed robot control episodes as well as simulated training instances generated based on user-directed robot control episodes.

Episode data is generated based on the simulated episodes in which one or more of the robot control policies are used to perform one or more simulated tasks and is stored, at least temporarily, in episode log 330. Episode log 330 can include long-term and/or short-term memory. The episode data stored in episode log 330 can include user command data based on commands issued by a user (i.e., the real user during the user-directed robot control episodes or the simulated user during the simulated training instances), action data that is based on actions implemented by the simulated robot, and/or can state data that is based on state data (environmental and/or robotic state data) determined based on sensor component(s) of the simulated robot (or another real world robot or simulated sensor component(s) of simulation engine 136).

Training engine 138 can process episode data from the episode log 330 to generate training instances that includes at least state data (e.g., simulated environment state data and/or robot state data), action data (e.g., joint command data and/or user command data), and one or more rewards, and optionally context information and/or other data (e.g., from one or more of the various sources of data 301A-301Z). The training instances can be provided by training engine 138 to robot control policy engine 320 to be used to train one or more of the robot control policies. Training engine 138 can generate the state data and action data based on the episode log 330. In some implementations, training engine 138 may associated portions of state data with portions of action data to create state/action pairs based on determining that timestamps or other sensor data included in episode log 330 or associated with episode data in episode log 330 indicates correlations between certain environmental and/or robot states and certain joint and/or user commands. In some implementations, the state/action pairs may be generated by simulation engine 136 or another part of simulation system 130 and then stored in episode log 330, where they may be retrieved by training engine 138.

A reward engine 352 of training engine 138 can generate positive and/or negative rewards based on episode data from the episode log 330. In some implementations, reward engine 352 can generate some or all of the rewards in a semi-supervised manner using, for example, state data from the episode log 330 and one or more automatic techniques to determine whether a robotic task, and/or portion(s) thereof, was successful. For example, if the robotic task is to pick up a particular object and move it to a new location, reward engine 352 can process vision data, that captures the new location at the end of the episode, to determine whether the particular object is present in the new location at the end of the episode, and generate the reward based on such a determination utilizing a reward function. In some implementations, reward engine 352 can additionally and/or alternatively generate some or all of the rewards by transmitting state data from the episode log 330 (or modified data based on such state data), to one or more remote computing devices for manual annotation by human reviewer(s). Reward engine 352 can then generate the reward(s) based on the annotation(s) provided by the human reviewer(s) and according to a reward function.

Training engine 138 stores the generated training instances, at least temporarily, in a database accessible to simulation system 130, such as database 139. Database 139 can include long-term and/or short-term memory. For example, the generated training instances can be stored as instances of episode data, where each instance includes a corresponding one of the state/action pairs, a corresponding one of the rewards, and optionally a corresponding instance of context information and/or other data. Robot control policy engine 320 accesses the training instances and/or episode data of database 139 in order to train one or more of the robot control policies.

In some implementations, robot control policy engine 320 can utilize a Q-learning algorithm, such as a distributed Q-learning algorithm (e.g., QT-Opt) suitable for continuous action spaces. The one or more robot control policies can be, for example, neural network models that represent value functions and that are utilized, during various iterations during a portion of an episode, to process current state data (an optionally context information) and a candidate action (e.g., joint and/or user command), and generate a value that reflects a likelihood that implementation of the candidate action will result in successful performance of the portion of the robotic task and/or of other portion(s) of the robotic task. Multiple candidate actions can be separately processed at each iteration, and a corresponding value for each generated and considered.

One or more of the robot control policies can alternatively be, for example, neural network models that are utilized, at various iterations during a portion of an episode, to process current state data (an optionally context information) and generate output that indicates an action to be implemented. For example, the output can include a vector of values that reflect an action. For instance, the value(s) can include first value(s) that reflect a translation vector for a robotic component, second value(s) that reflect a rotation vector for the robotic component, and third value(s) that reflect other state(s) for the robotic component (e.g., if the robotic component is a gripper, whether it should be open or closed).

As described herein, after at least initial training of an existing robot control policy, an updated version of the robot control policy can be at least selectively utilized by simulation engine 136 in performing a corresponding portion of various episodes. As robot control policy engine 320 further trains the robot control policy, a further updated version of the robot control policy can be at least selectively utilized by simulation engine 136. Multiple iterations of this can occur, with progressively further trained versions of the robot control policy being utilized by simulation engine 136 at each of the iterations.

As mentioned previously. simulation engine 136 can be used to simulate various environments that include corresponding environmental objects, to simulate a robot operating in the environment, to simulate user commands issued to a robot controller for virtual implementation of various simulated robotic actions, to simulate joint commands issued from a robot controller to a robot for virtual implementation of various simulated robotic actions, to simulate responses of the robot in response to virtual implementation of various simulated robotic actions, and to simulate interactions between the robot and the environmental objects in response to the simulated robotic actions. Various simulators can be utilized, such as physics engines that simulate collision detection, soft and rigid body dynamics, etc. Accordingly, simulated training instances described herein can include episodes that are performed by a real world robot and/or that are performed by simulation engine 136 (e.g., by simulating the simulated robot).

The various types and sources of information 301A-301Z used by simulation engine 136, and in some implementations, by training engine 138, can include one or more task indications 301A which may include indications of a simulated robotic task to be performed by the simulate robot 100. Such indications may further include negative indications of aspects of a task that must not be performed in order for a task, or a portion of a task, to be considered successful. For example, one or more task indications 301A may indicate that the simulated robot should grab various simulated object parts and assemble them in a specific way, without dropping any of the parts. In some implementations, task indications 301A may include high-level descriptions of tasks to be performed. In some implementations, task indications 301A may include specific sensor readings, or specific ranges or thresholds of sensor readings, that simulated sensors associated with the simulated robot must satisfy. The various types and sources of information 301A-301Z further include time constraint data 301B. Time constraint data 301B can include time constraints associated with successful completion of the task(s). For example, time constraint data 301B may indicate one or more time constraints for completing certain actions (e.g., globally, or with respect to certain state data associated with the episode, such as the speed of a conveyor belt), one or more time constraints for performance by the external robot controller (e.g., for generating joint commands based on simulated sensor data and/or received user commands), and/or one or more time constraints for simulated sensors to respond to state data or action data.

RGB/RGBD imagery data 301C, and/or other types of simulated vision data, may also be included in the various types and sources of information 301A-301Z used by simulation engine 136, and in some implementations, by training engine 138. In various implementations, other types and/or sources of simulated sensor data 301Z may also be included in the various types and sources of information 301A-301Z used by simulation engine 136, and in some implementations, by training engine 138. For example, historical sensor data and/or tolerances of various sensors may be included in other sensor data 301Z.

Figure 4:
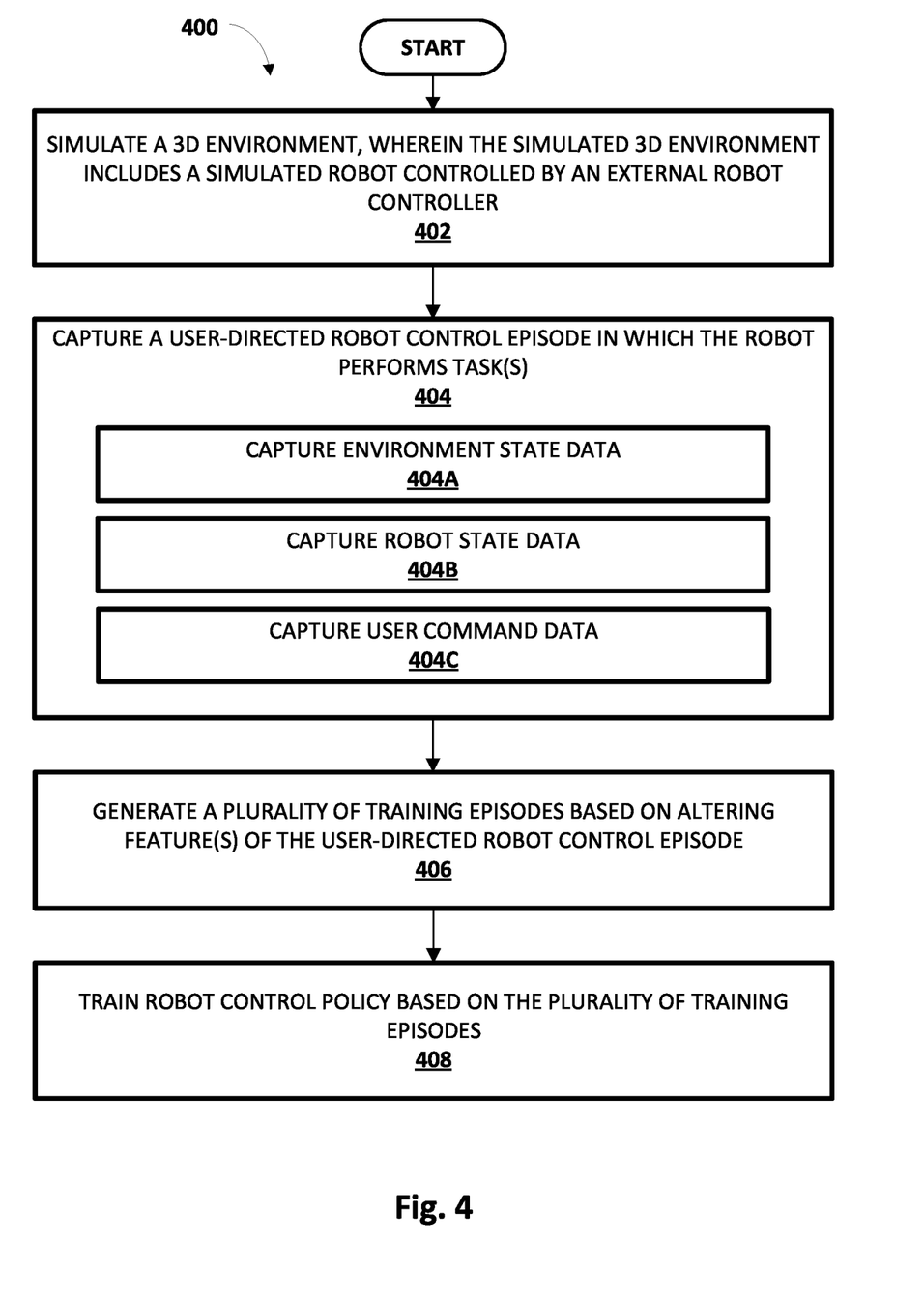
FIG. 4 is a flowchart illustrating an example method of training a robot control policy using a plurality of training instances generated based on a captured user-directed robot control episode.

Referring now to FIG. 4, an example method 400 of training a robot control policy using a plurality of training instances generated based on a captured user-directed robot control episode is provided. For convenience, the operations of the flowchart are described with reference to a system that performs the operations. This system may include various components of various computer systems. For instance, some operations may be performed at simulation engine 136, while other operations may be performed by one or more other components of simulation system 130. Moreover, while operations of method 400 are shown in a particular order, this is not meant to be limiting. One or more operations may be reordered, omitted or added.

At block 402, the system, e.g., by way of simulation engine 136, may simulate a 3D environment that includes a simulated robot (e.g., 100, 200) controlled by an external robot controller (e.g., 102 and 103).

At block 404, the system (e.g., simulation engine 136) captures a user-directed episode of robot control in which the simulated robot performs one or more tasks. In various implementations, capturing the user-directed episode of robot control can include one or more of blocks 404A-404C. At block 404A, the system can capture environment state data indicating one or more states of the simulated environment during the episode. At block 404B, the system can capture robot state data indicating one or more states of the robot and/or commands that can affect the state of the simulated robot (e.g., queued joint commands). At block 404C, the system can capture user command data indicating one or more user commands issued to the external robot controller. In some implementations, the system may capture the user commands in the form that they were issued to the external robot controller (e.g., voice recordings, button presses). In some implementations, the system may issue the user commands as they are understood by the external robot controller (e.g., after being transformed or combined with data that the external robot controller can use to make various determinations and/or issue joint commands).

At block 406, the system may generate a plurality of training instances based on altering features of the user-directed robot control episode. The system may simulate training instances including altered user commands (e.g., timing, magnitude, wording, adding/omitting commands, etc.), altered joint commands (e.g., timing, magnitude, joint selection, adding/omitting commands, etc.), altered environment state data of the simulated environment (e.g., adding/omitting objects, changing positions/poses/colors/textures of objects, etc.), and/or altered robot state data (e.g., timing or manner of receipt of commands, capabilities, simulated hardware features such as sensors, etc.).

At block 408, the system may train one or more robot control policies based on the plurality of simulated training instances. For example, simulation engine 136 may communicate with the external robot controller to simulate performance of the robotic tasks by the simulated robot during the altered conditions of the user-directed robot control episode, as determined at block 406. For example, rather than the user issuing various user commands to the external robot controller to direct the simulated robot to perform the task, simulation engine 136 may simulate slightly altered user commands to the external robot controller. As another example, simulation engine 136 may delay or alter joint commands received from the external robot controller and used for controlling the simulated robot during the episode. Based on the simulation episode data received by the system during simulation of the episodes, one or more robot control policies may be trained. For example, training engine 138 may generate training instance input and training instance output for training a robot control policy machine learning model.

The training instance input may include environment state data, robot state data, user command data, and/or joint command data for a given training instance. In some implementations, the training instance input may further include other contextual information relevant to simulating the training instance or evaluating performance of the simulated robot during the training instance, such as contextual information about the user-directed robot control episode(s) used in generating a given training instance or benchmark performance models. The training instance output may include one or more rewards determined by the system (e.g., training engine 138) based on performance of the robotic task by the simulated robot. In some implementations, training engine 138 may determine one or more sub-tasks of the robotic task to be performed by the simulated robot, and may further train one or more of the robot control policies based on simulated data and rewards corresponding to the sub-tasks.

Figure 5A:
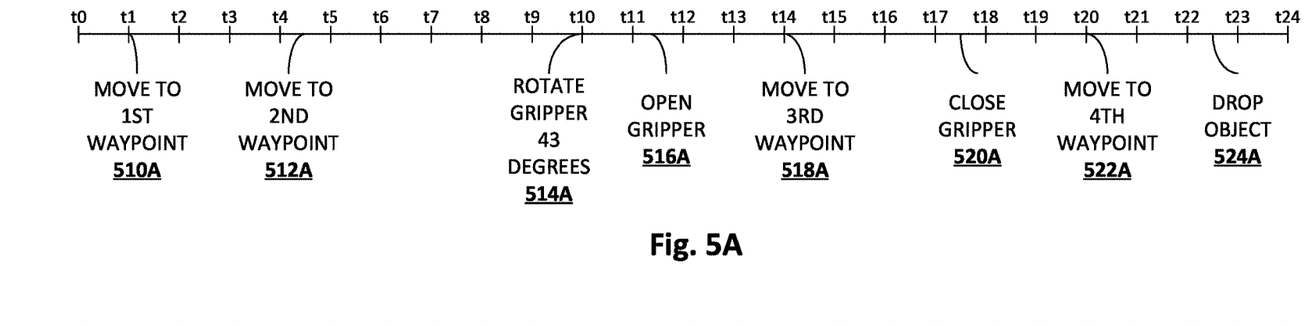
FIG. 5A, FIG. 5B, and FIG. 5C illustrate examples of simulating training instances based on a user-directed robot control episode, according to implementations disclosed herein.
Figure 5B:
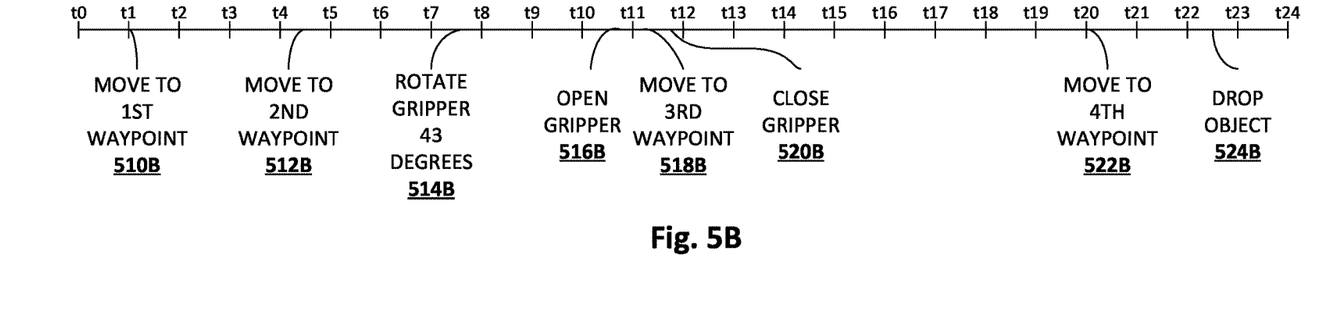
Figure 5C:
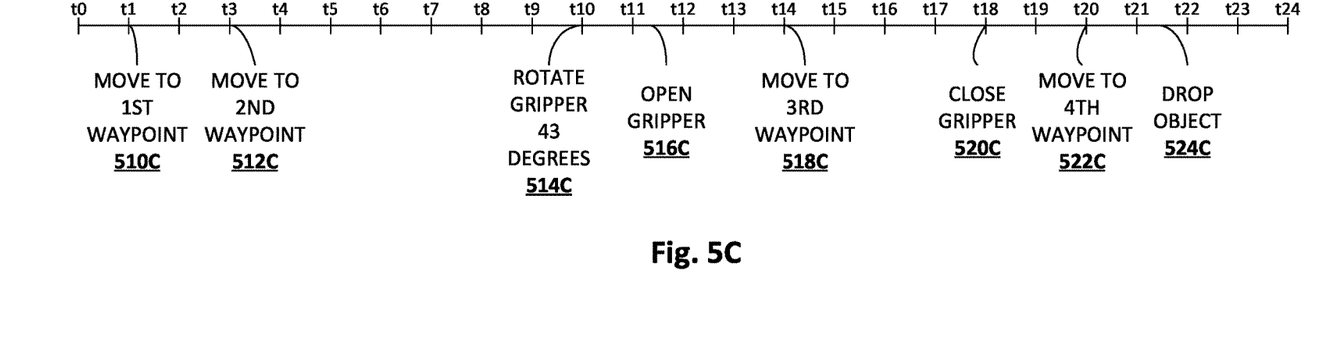

FIGS. 5A-5C illustrate examples of simulating training instances based on a user-directed robot control episode, according to implementations disclosed herein. For convenience, the operations disclosed in FIGS. 5A-5C are described with reference to a system that performs the operations. This system may include various components of various computer systems, such as simulation system 130. The operations of FIGS. 5A-5C are described with respect to timestamps $t_0$-$t_{24}$ that are merely meant to be illustrative. The timestamps $t_0$-$t_{24}$ of FIGS. 5A-5C do not necessarily represent equally spaced units of time. FIG. 5A represents the user-directed robot control episode, while FIGS. 5B-5C represent two training instances simulated based on the user-directed robot control episode of FIG. 5A. The commands 510A-524A represent user commands issued by the user and/or joint commands received by the simulated robot that are based on user commands issued by the user. The commands 510B-524B and 510C-524C represent simulated user commands and/or joint commands corresponding to the simulated user commands.

FIG. 5A depicts a user-directed robot control episode in which a user issues user commands 510A-524A to an external controller (e.g., 102 and/or 103) to cause a simulated robot (e.g., simulated robot 100' and/or 200) to perform various simulated robotic tasks. At t1, the user issues command 510A directing the simulated robot to move to the first waypoint which correspond to a direction for the simulated robot, or a portion of the simulated robot (e.g., robotic arm or portion of a robotic arm), to move to a particular position. Between t4 and t5, the user issues command 512A directing the simulated robot (or a portion thereof) to move to a second waypoint. At t10, the user issues command 514A directing the simulated robot to rotate its gripper (e.g., end effector) forty-three degrees. Between t11 and t12, the user issues command 516A directing the simulated robot to open its gripper. At t14, the user issues command 518A directing the simulated robot to move to the third waypoint which may, for example, represent a point where a gripper of the simulated robot may be situated around a simulated object to be picked up. Between t17 and t18, the user issues command 520A directing the simulated robot to close the gripper which may, for example, cause the gripper of the simulated robot to close around the simulated object. At t20 the user issues command 522A directing the simulated robot to move to the fourth waypoint which may, for example, correspond to a bin in which the simulated robot is to place the simulated object. Between t22 and t23, the user issues command 524A directing the simulated robot to drop the simulated object.

The user-directed robot control episode of FIG. 5A may represent a successful completion of a particular robotic task by a simulated robot. For example, the task may be for the simulated robot to move to a particular position near a conveyor belt (e.g., 510A), to lift its robotic arm (e.g., 512A), to rotate its gripper to a particular pose (e.g., 514A), to open its gripper (e.g., 516A), to move its gripper around a simulated object (e.g., 518A), to close its gripper around the simulated object (e.g., 520A), to move near a bin (e.g., 522A), and to drop the simulated object into the bin (e.g., 524A). In some implementations, the user-directed robot control episodes used to simulate training instances may also include one or more unsuccessful robot control episodes (e.g., simulated robot fails at gripping the object and knocks it on the floor). In some implementations 510A-524A, and their associated timestamps, may represent times at which joint commands are received by the simulated robot rather than times at which the external robot controller receives the commands.

Referring now to the example simulated training instance of FIG. 5B, the example task discussed above involving picking up a simulated object off a conveyor belt and dropping it in a bin will be used. At t1 simulated command 510B directs the simulated robot to move to the first waypoint (e.g., near conveyor belt). Between t4 and t5, command 512B directs the simulated robot to move to the second waypoint (e.g., position robotic arm). However, the timing of command 514B (e.g., rotate gripper) is altered with respect to the user-directed robot control episode of FIG. 5A and is now issued between t7 and t8, representing an earlier time period than the time period in which the corresponding command was issued in FIG. 5A. In the example simulated training instance of FIG. 5B, this may represent the simulated robot being directed to rotate its gripper before it has finished moving its robotic arm to the second waypoint.

However, in this example, the simulated robot may continue moving its robotic arm towards the second waypoint and, thus, being directed to rotate its gripper early will have no effect on the ultimate success or failure of the simulated robot at completing the simulated robotic task. For example, such a simulated robot may include or have access to a command queue, and thus be able to complete non-conflicting successively issued commands simultaneously. Between t10 and t11, the simulated robot is directed to open its gripper via command 516B. Similar to execution of command 514B, this may not affect the success or failure of the robotic task even if the simulated robot has not yet finished moving its robotic arm to the second waypoint. Between t11 and t12, successive commands are received by the simulated robot in a short period of time, directing the simulated robot to move its robotic arm to the third waypoint (e.g., to enclose the simulated object) 518B and then directing the simulated robot to close its gripper 520B.

In this example, the short duration of time between the commands being issued (and/or received) does not present a problem for the simulated robot performing the robotic task. For example, the simulated robot may have already moved its robotic arm to the third waypoint, or at least to a position close enough to the third waypoint to grasp the simulated object when it is directed to close its gripper. At t20 the simulated robot is directed to move to the fourth waypoint (e.g., near the bin) 522B, and between t22 and t23 the simulated robot is directed to drop the simulated object in the bin 512B. In this example, the simulated robot may have reached the fourth waypoint (e.g., near the bin) by t22, and may be able to successfully drop the simulated object in the bin. The example simulated training instance of FIG. 5B may therefore represent a successful execution of the robotic task, and may be associated with a positive reward in order to train one or more robot control policies, as described herein.

The example simulated training instance of FIG. 5C may represent an unsuccessful execution of the example simulated robotic task discussed above with respect to FIGS. 5A-5B. At t1, the simulated robot is directed to move to the first waypoint 510C, and at t3 the simulated robot is directed to move its robotic arm to the second waypoint 512C. In this example, the short time period between commands 510C and 512C causes the simulated robot to begin moving its arm before it has finished moving towards the conveyor belt. At t10 the simulated robot is directed to rotate its gripper forty-three degrees 514C. Between t11 and t12, the simulated robot is directed to open its gripper 516C. At t14, the simulated robot is directed to move its robotic arm to the third waypoint 518C, which may be the position in which it grasps a simulated object moving along the conveyor belt. In this example, the simulated robot may not be directed to close its gripper until t18 at 520C. This may represent a time period after the simulated object has moved out of the simulated robot's reach on the conveyor belt, thus the simulated robot will not be able to successfully grip the simulated object. At t20 the simulated robot is directed to move to the fourth waypoint 522C, near the bin. When the simulated robot is directed to drop the simulated object 524C at a time between t21 and t22, the simulated robot will fail as there will be no simulated object in its grasp. Thus, a negative reward may be associated with this simulated training instance in order to train one or more robot control policies, as described herein.

In some implementations, the robotic task of FIGS. 5A-5C may include several sub-tasks, such as: successfully moving near the conveyor belt without hitting anything, successfully grasping the object, and successfully moving the object to the bin. In such implementations, portions of the simulated training instances corresponding to those sub-tasks may be assigned one or more rewards. Thus, the one or more robot control policies may be trained based on multiple rewards correlated to multiple portions of a given simulated training instance.

Figure 6:
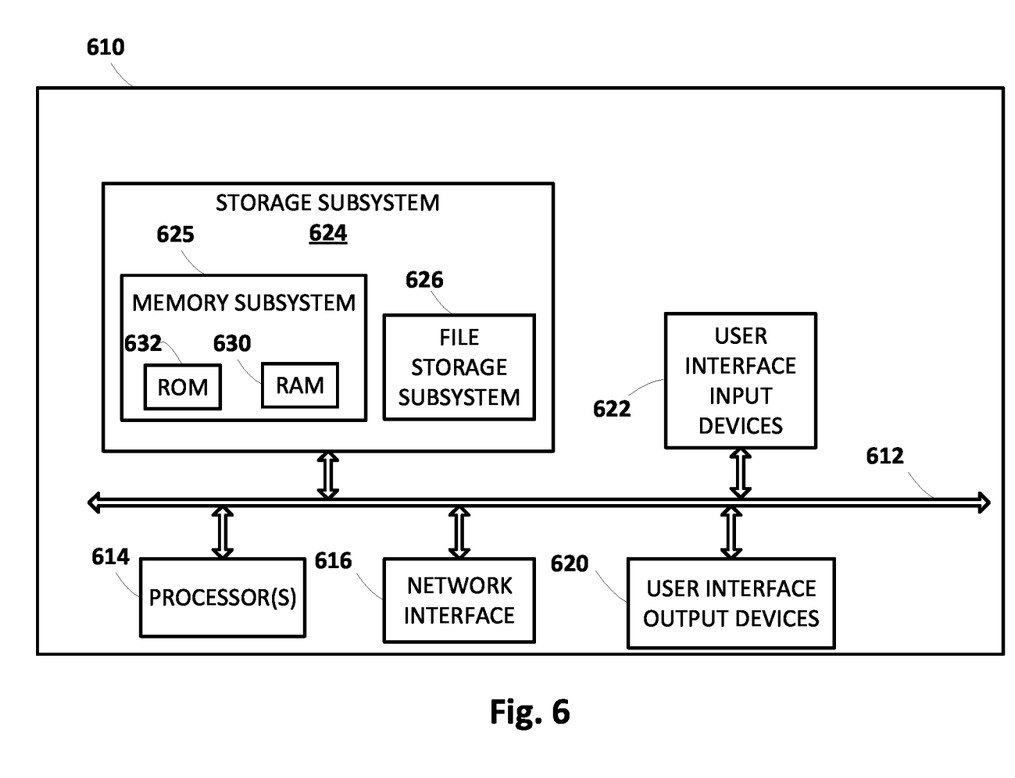
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected operations described herein, and/or to implement one or more aspects of the simulated robot (e.g., 100 and/or 200) or simulation system 130. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

simulating a three-dimensional (3D) environment, wherein the simulated 3D environment includes a simulated robot controlled by an external robot controller;

capturing a user-directed robot control episode in which the simulated robot performs one or more tasks, the user-directed robot control episode including:

first state data describing one or more states of the simulated 3D environment, user command data describing joint commands issued by the external robot controller to control the simulated robot in the simulated 3D environment, wherein the joint commands are issued by the external robot controller in response to one or more user commands issued by a user to the external robot controller, and second state data describing one or more states of the simulated robot;

altering the captured user-directed robot control episode to generate a plurality of training instances, wherein each training instance of the plurality comprises at least one of the joint commands captured in the user-directed robot control episode with a timing that is altered with respect to the same at least one of the joint commands of the user-directed robot control episode; and training one or more robot control policies based on the plurality of training instances.

2. The method of claim 1, wherein at least one training instance of the plurality of training instances is generated based on altering at least one feature of the first state data describing one or more states of the simulated 3D environment.

3. The method of claim 2, wherein altering the at least one feature of the first state data describing one or more states of the simulated 3D environment includes altering a lighting condition of the simulated 3D environment.

4. The method of claim 2, wherein altering the at least one feature of the first state data describing one or more states of the simulated 3D environment includes altering one or more textures or colors of one or more surfaces of the simulated 3D environment.

5. The method of claim 2, wherein altering the at least one feature of the first state data describing one or more states of the simulated 3D environment includes altering a position of an interactive object in the simulated 3D environment.

6. The method of claim 1, wherein altering one or more of the joint commands includes omitting one or more of the joint commands.

7. The method of claim 1, wherein altering one or more of the joint commands includes altering a magnitude associated with one or more of the joint commands.

8. The method of claim 1, wherein training the one or more robot control policies based on the plurality of training instances comprises, for each given training instance of the plurality of training instances:

simulating one or more robots in the simulated 3D environment to perform one or more of the tasks, and training one or more of the robot control policies based on outcomes of the simulated robot performing one or more of the tasks in the simulated 3D environment.

9. A system, comprising:

one or more processors; and one or more memory storage devices storing instructions that, when executed by the one or more processors, cause the one or more processors to perform operations comprising:

simulating a three-dimensional (3D) environment, wherein the simulated 3D environment includes a simulated robot controlled by an external robot controller;

capturing a user-directed robot control episode in which the simulated robot performs one or more tasks, the user-directed robot control episode including:

first state data describing one or more states of the simulated 3D environment, user command data describing joint commands issued by the external robot controller to control the simulated robot in the simulated 3D environment, wherein the joint commands are issued by the external robot controller in response to one or more user commands issued by a user to the external robot controller, and second state data describing one or more states of the simulated robot;

altering the captured user-directed robot control episode to generate a plurality of training instances, wherein each training instance of the plurality of training instances comprises at least one of the joint commands captured in the user-directed robot control episode with a timing that is altered with respect to the same at least one of the joint commands of the user-directed robot control episode; and training one or more robot control policies based on the plurality of training instances.

10. The system of claim 9, wherein at least one training instance of the plurality of training instances is generated based on altering at least one feature of the first state data describing one or more states of the simulated 3D environment.

11. The system of claim 10, wherein altering the at least one feature of the first state data describing one or more states of the simulated 3D environment includes altering a lighting condition of the simulated 3D environment.

12. The system of claim 10, wherein altering the at least one feature of the first state data describing one or more states of the simulated 3D environment includes altering one or more textures or colors of one or more surfaces of the simulated 3D environment.

13. The system of claim 10, wherein altering the at least one feature of the first state data describing one or more states of the simulated 3D environment includes altering a position of an interactive object in the simulated 3D environment.

14. The system of claim 9, wherein altering one or more of the joint commands comprises altering a magnitude associated with one or more of the joint commands.

15. The system of claim 9, wherein training the one or more robot control policies based on the plurality of training instances comprises, for each given training instance of the plurality of training instances:

simulating one or more robots in the simulated 3D environment to perform one or more of the tasks, and training one or more of the robot control policies based on outcomes of the simulated robot performing one or more of the tasks in the simulated 3D environment.

16. A computer-readable storage medium comprising instructions that, when executed by at least one processor of a computing device, cause the at least one processor to:

simulate a three-dimensional (3D) environment, wherein the simulated 3D environment includes a simulated robot controlled by an external robot controller;

capture a user-directed robot control episode in which the simulated robot performs one or more tasks, the user-directed robot control episode including:

first state data describing one or more states of the simulated 3D environment, user command data describing joint commands issued by the external robot controller to control the simulated robot in the simulated 3D environment, wherein the joint commands are issued by the external robot controller in response to one or more user commands issued by a user to the external robot controller, and second state data describing one or more states of the simulated robot;

alter the captured user-directed robot control episode to generate a plurality of training instances, wherein each training instance of the plurality comprises at least one of the joint commands captured in the user-directed robot control episode with a timing that is altered with respect to the same at least one of the joint commands of the user-directed robot control episode; and train one or more robot control policies based on the plurality of training instances.

* * * * *